Patented May 28, 1935

2,002,622

UNITED STATES PATENT OFFICE 2,002,622

NATURAL AND ARTIFICIAL RUBBER LATEX

Ira Williams, Woodstown, N. J., and Benton Dales, Chadds Ford, Pa., assignors to E. I. du Pont de Nemours & Company, Wilmington, Del., a corporation of Delaware No Drawing. Application May 20, 1933, Serial No. 672,040

19 Claims. (Cl. 18—50)

This invention relates to natural and artificial rubber latex and particularly to a process for increasing the stability thereof.

As is well known, latex tends to coagulate upon the addition thereto of compounding ingredients such as fine powders and during all processes involving mechanical handling, such as pouring and stirring. In order to inhibit such coagulation and to improve the stability of the latex, it has been usual to incorporate a small amount of ammonia or ammonium hydroxide into the latex. While this expedient greatly improves the stability of the latex, the ammoniacal latex is still rather unstable requiring great care to be taken in the handling thereof and, particularly, in the incorporation of compounding ingredients therein.

An object of the present invention is to increase the stability of latex. A further object is to increase the stability of rubber latex preserved with ammonia. Other and further objects are to provide new compositions of matter and to advance the art. Other objects will appear hereinafter.

These objects may be accomplished according to our invention which comprises incorporating in a rubber type latex a small amount of a member of the group comprising sulfonated abietane, sulfonated abietene and sulfonated abietine whereby the stability of the latex is greatly increased. The amount of these sulfonated products which may be added to the latex may be varied within a rather wide range. For economic reasons, amounts between about 0.1 to about 3.0% will be preferred. However, we have found that 0.5% or less of the sulfonated products, based on the solid content of the latex, will usually be found to be satisfactory; larger amounts may be used but usually without advantage.

When abietic acid or, in practice, rosin is heated as described in the U. S. patent to C. O. Henke, 1,853,353, there is obtained a degradation product known as abietene which, when treated with sulfuric acid in accordance with Patent 1,853,352, produces sulfonated abietene which is a product sold under the trade name of Neopen SS. When the above rosin degradation product, abietene, is hydrogenated, there is obtained a saturated body known as abietane which may also be sulfonated as described in Patent 1,853,348 to Gubelmann and Henke to produce sulfonated abietane. Sulfonated abietane is a wetting and dispersing agent very similar in its properties to sulfonated abietene and is superior to the sulfonated abietene for some purposes. A third compound known as abietine may be obtained by first treating rosin with an acid chloride and then subjecting it to decomposition by heat. Abietine is less saturated than either abietene or abietane. Abietine may be sulfonated by employing a method such as is employed in sulfonating abietene and abietane. All of these sulfonates may be further condensed with aldehydes to produce bodies that have outstanding tanning, as well as wetting and dispersing properties. The preparation of abietene sulfonate is described in detail in the Journal of Industrial and Engineering Chemistry Vol. 23, p. 1462 (1931). U. S. Patents 1,897,119 and 1,897,120 are also of interest.

In order to more clearly illustrate our invention and the preferred mode in which we contemplate carrying the same into effect the following examples are given:

Example 1

0.075 gram of sulfonated abietene was added to 50 cc. of Hevea latex containing 30% by weight of solids and preserved with ammonia. The latex was then agitated over an extended period of time with a high speed stirrer. Coagulation started after 24 minutes. Upon subjecting a sample of the same latex, which did not contain sulfonated abietene, to the same test, the latex coagulated in 4 minutes.

Example 2

38 cc. of latex containing 40% polymerized chlor-2-butadiene-1:3, commonly known as Du Prene, were diluted with 12 cc. of water to make 50 cc. of a 30% latex. When subjected to the action of a high speed stirrer, this latex coagulated extensively in less than one minute. Upon adding 0.3 grams of sulfonated abietene to the water in an exactly similar mix and then subjecting the mix to the action of the high speed stirrer, only a minimum amount of coagulation occurred after 30 minutes of stirring.

Example 3

40 cc. of 38% rubber latex were diluted to 50 cc. 3.75 grams of whiting were made into a cream with 10 cc. of water containing 0.075 grams of sulfonated abietene which was then mixed with the latex. High speed stirring caused coagulation to start in this mix in 6 minutes. In a similar mix prepared without the sulfonated abietene, coagulation started in 2 minutes.

It also appears that greatly improved results will usually be obtained if a part of the sulfonated compound is added to the latex and a part to the water suspension of the compounding ingredient prior to the admixture of the latex with the water suspension. This modification may be illustrated by the following example:

*Example 4*

If rubber latex has the usual concentration of 38% solids, 285 cc. will contain about 100 gms. rubber. To this should be added 0.1 gm. sulfonated abietane in 2 or 3 cc. water. 100 gms. of pigmented abietane (blanc fixe, whiting, etc.) are mixed with 125 cc. of water containing approximately 0.4 gm. sulfonated abietane. This creamy suspension is then stirred into the above latex.

The amount of water may be varied from about 100 to 175 cc. or more, according to the nature of the compounding material used and the concentration desired.

It will be noted that latices containing 30% solids were treated in Examples 1 to 3 inclusive. The 30% concentration is the usual concentration at which stability tests are made in square 100 cc. bottles with a high speed stirrer and it is for this reason that such concentration was employed in Examples 1 to 3. It will be understood that our invention will generally be employed with commercial latex of the usual commercial concentration which is generally 38% or above. The concentration of the solids in the latex does not appear to affect the effectiveness of our compounds and they will be found to be equally as effective in the commercial latices of usual concentration.

While, in the examples, we have disclosed the use of sulfonated abietene and sulfonated abietane, it will be apparent that sulfonated abietine may be substituted therefor, if desired. Also, we have described the use of our sulfonated products in only natural latex and Du Prene latex. However, equally good results may be attained by the incorporation of the sulfonated products in other artificial latices, such as those prepared by the dispersion of crude or reclaimed rubber or dispersed mineral rubber and asphalt type materials. The sulfonated products are equally effective when employed with other pigments, such as clay, zinc oxide, barytes, organic and inorganic colors, sulfur, carbon black and the like, as when it is employed with whiting.

By incorporating our sulfonated products in latex, it is possible to not only add larger amounts of solid compounding ingredients but the tendency toward coagulation upon handling and subjection to other mechanical action is largely eliminated.

This application is a continuation in part of our application Serial No. 624,144 filed July 22, 1932.

While we have disclosed the incorporation of our compounds in specific proportions in certain latices, it will be understood that the proportions employed may be widely varied and the compounds may be incorporated in other latices not specifically mentioned, without departing from the spirit of our invention. Accordingly, the scope of our invention is to be limited solely by the appended claims construed as broadly as is permissible in view of the prior art.

We claim:

1. The process of stabilizing artificial and natural latex which comprises incorporating, in the latex, a member of the group consisting of sulfonated abietane, sulfonated abietene and sulfonated abietine in an amount sufficient to materially increase the stability of the latex.

2. The process of stabilizing artificial and natural latex which comprises incorporating, in the latex, approximately 0.5% of a member of the group consisting of sulfonated abietane, sulfonated abietene and sulfonated abietine, based on the solid content of the latex.

3. The process of stabilizing artificial and natural latex which comprises incorporating, in the latex, compounding ingredients and a member of the group consisting of sulfonated abietane, sulfonated abietene and sulfonated abietine in an amount sufficient to materially increase the stability of the latex.

4. The process of stabilizing artificial and natural latex which comprises incorporating, in the latex, compounding ingredients and approximately 0.5% of a member of the group consisting of sulfonated abietane, sulfonated abietene and sulfonated abietine, based on the solid content of the latex.

5. The process of preparing artificial and natural latex which comprises the steps of adding to the latex a small amount of a member of the group consisting of sulfonated abietane, sulfonated abietene and sulfonated abietine, and then adding, to the latex, water containing compounding ingredients and a small amount of a member of the group consisting of sulfonated abietane, sulfonated abietene and sulfonated abietine, the total amount of the sulfonated compounds added being sufficient to materially increase the stability of the latex.

6. The process of preparing artificial and natural latex which comprises the steps of adding to the latex about 0.1% of a member of the group consisting of sulfonated abietane, sulfonated abietene and sulfonated abietine, and then adding, to the latex, water containing compounding ingredients and about 0.4% of a member of the group consisting of sulfonated abietane, sulfonated abietene and sulfonated abietine.

7. Artificial and natural latices having incorporated therein a member of the group consisting of sulfonated abietane, sulfonated abietene and sulfonated abietine in an amount sufficient to materially increase the stability of the latex.

8. Artificial and natural latices having incorporated therein approximately 0.5% of a member of the group consisting of sulfonated abietane, sulfonated abietene and sulfonated abietine, based on the solid content of the latex.

9. Artificial and natural latices having incorporated therein compounding ingredients and a member of the group consisting of sulfonated abietane, sulfonated abietene and sulfonated abietine in an amount sufficient to materially increase the stability of the latex.

10. Artificial and natural latices having incorporated therein compounding ingredients and approximately 0.5% of a member of the group consisting of sulfonated abietane, sulfonated abietene and sulfonated abietine, based on the solid content of the latex.

11. Artificial and natural latices obtainable by adding to the latex a small amount of a member of the group consisting of sulfonated abietane, sulfonated abietene and sulfonated abietine, and then adding, to the latex, water containing compounding ingredients and a small amount of a member of the group consisting of sulfonated abietane, sulfonated abietene and sulfonated abietine, the total amount of the sulfonated compounds added being sufficient to materially increase the stability of the latex.

12. Artificial and natural latices obtainable by adding to the latex about 0.1% of a member of the group consisting of sulfonated abietane, sulfonated abietene and sulfonated abietine, and then adding, to the latex, water containing compounding ingredients and about 0.4% of a member of the group consisting of sulfonated abietane, sulfonated abietene and sulfonated abietine.

13. The process of stabilizing artificial and natural latex which comprises incorporating, in the latex, sulfonated abietene in an amount sufficient to materially increase the stability of the latex.

14. The process of stabilizing artificial and natural latex which comprises incorporating, in the latex, approximately 0.5% of sulfonated abietene, based on the solid content of the latex.

15. The process of stabilizing artificial and natural latex which comprises incorporating, in the latex, compounding ingredients and sulfonated abietene in an amount sufficient to materially increase the stability of the latex.

16. The process of preparing artificial and natural latex which comprises the steps of adding to the latex about 0.1% of sulfonated abietene, and then adding, to the latex, water containing compounding ingredients and about 0.4% of sulfonated abietene.

17. Artificial and natural latices having incorporated therein sulfonated abietene in an amount sufficient to materially increase the stability of the latex.

18. Artificial and natural latices having incorporated therein approximately 0.5% of sulfonated abietene based on the solid content of the latex.

19. Artificial and natural latices having incorporated therein compounding ingredients and sulfonated abietene in an amount sufficient to materially increase the stability of the latex.

IRA WILLIAMS.
BENTON DALES.

CERTIFICATE OF CORRECTION.

Patent No. 2,002,622. May 28, 1935.

IRA WILLIAMS, ET AL.

It is hereby certified that error appears in the printed specification of the above numbered patent requiring correction as follows: Page 2, second column, line 62, claim 10, for "abietene" second occurrence read abietine; and that the said Letters Patent should be read with this correction therein that the same may conform to the record of the case in the Patent Office.

Signed and sealed this 16th day of July, A. D. 1935.

Leslie Frazer (Seal) Acting Commissioner of Patents.